US011945284B2

(12) United States Patent
Saroka et al.

(10) Patent No.: US 11,945,284 B2
(45) Date of Patent: Apr. 2, 2024

(54) TRANSPORTATION REFRIGERATION UNIT WITH DC GENERATOR CHARGING OF PRIME MOVER ENERGY STORAGE DEVICE

(71) Applicant: Carrier Corporation, Palm Beach Gardens, FL (US)

(72) Inventors: Mary D. Saroka, Syracuse, NY (US); Jeffrey J. Burchill, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 463 days.

(21) Appl. No.: 15/734,165

(22) PCT Filed: Sep. 13, 2019

(86) PCT No.: PCT/US2019/050958
§ 371 (c)(1),
(2) Date: Dec. 1, 2020

(87) PCT Pub. No.: WO2020/068450
PCT Pub. Date: Apr. 2, 2020

(65) Prior Publication Data
US 2021/0213806 A1 Jul. 15, 2021

Related U.S. Application Data

(60) Provisional application No. 62/738,671, filed on Sep. 28, 2018.

(51) Int. Cl.
*B60H 1/32* (2006.01)
*B60H 1/00* (2006.01)
(Continued)

(52) U.S. Cl.
CPC ....... *B60H 1/3226* (2013.01); *B60H 1/00014* (2013.01); *B60H 1/00364* (2013.01);
(Continued)

(58) Field of Classification Search
CPC ............ B60H 1/00014; B60H 1/00364; B60H 1/00428; B60H 1/3226; B60H 1/3232;
(Continued)

(56) References Cited

U.S. PATENT DOCUMENTS 3,866,433 A 2/1975 Krug
4,761,577 A 8/1988 Thomas et al.
(Continued)

FOREIGN PATENT DOCUMENTS

CN 207481745 U 6/2018
DE 102014206237 A1 10/2015
(Continued)

OTHER PUBLICATIONS

International Search Report for International Application No. PCT/US2019/050958; Application Filing Date: Sep. 13, 2019; dated Dec. 16, 2019; 6 pages.
(Continued)

Primary Examiner — Eric S Ruppert
Assistant Examiner — Hans R Weiland
(74) Attorney, Agent, or Firm — CANTOR COLBURN LLP

(57) ABSTRACT

A transportation refrigeration unit TRU (26) and power system. The TRU (26) and power system including a compressor (58) configured to compress a refrigerant, an evaporator heat exchanger (76) operatively coupled to the compressor (58), and an evaporator fan (98) configured to provide return airflow and flow the return airflow over the evaporator heat exchanger (76). The system also includes a return air temperature RAT sensor (142) disposed in the
(Continued)

return airflow and configured measure the temperature of the return airflow, a TRU controller (82) operably connected to the RAT sensor (142) and configured to execute a process to determine an AC power requirement for the TRU (26) based on at least the RAT (142), a generator power converter (164*a*) configured to provide a second DC power (165*b*), an energy storage system (150) configured to receive the second DC power (165) and provide a three phase AC power (157) to a power management system (124).

20 Claims, 8 Drawing Sheets

(51) Int. Cl.
| | | |
|---|---|---|
| *H02J 7/00* | (2006.01) | |
| *H02J 7/02* | (2016.01) | |
| *H02M 7/04* | (2006.01) | |
| *H02M 7/44* | (2006.01) | |

(52) U.S. Cl.
CPC ....... *B60H 1/00428* (2013.01); *B60H 1/3232* (2013.01); *H02J 7/0068* (2013.01); *H02J 7/02* (2013.01); *B60H 2001/3261* (2013.01); *B60H 2001/3292* (2013.01); *H02J 2207/20* (2020.01); *H02J 2310/40* (2020.01); *H02M 7/04* (2013.01); *H02M 7/44* (2013.01)

(58) Field of Classification Search
CPC .... B60H 2001/3261; B60H 2001/3292; B60Y 2200/147; F25B 40/00; H02J 7/0068; H02J 7/02; H02J 7/1415; H02J 2207/20; H02J 2310/40
See application file for complete search history.

(56) References Cited

U.S. PATENT DOCUMENTS

| | | | |
|---|---|---|---|
| 5,265,435 A | | 11/1993 | Richardson |
| 6,725,713 B2 | | 4/2004 | Adamson et al. |
| 7,043,932 B2 | | 5/2006 | Tofflemire |
| 7,259,469 B2 | | 8/2007 | Brummett et al. |
| 7,261,171 B2 | | 8/2007 | de la Torre et al. |
| 7,403,103 B2 | | 7/2008 | Pearman |
| 7,514,803 B2 | | 4/2009 | Wilks |
| 7,547,980 B2 | | 6/2009 | Harrison |
| 7,673,466 B2 | | 3/2010 | Pacy |
| 7,797,958 B2 | | 9/2010 | Alston et al. |
| 8,295,950 B1 | | 10/2012 | Wordsworth et al. |
| 8,347,999 B2 | | 1/2013 | Koelsch et al. |
| 8,701,430 B2 | | 4/2014 | Kitano et al. |
| 8,723,344 B1 | | 5/2014 | Dierickx |
| 8,776,541 B2 | | 7/2014 | Steele et al. |
| 8,776,928 B2 | | 7/2014 | Stover, Jr. et al. |
| 8,825,242 B2 | | 9/2014 | Foster |
| 8,905,166 B2 | | 12/2014 | Dalum et al. |
| 8,935,933 B1 | | 1/2015 | Koelsch |
| 9,126,544 B2 | * | 9/2015 | Larson ............... B60R 16/03 |
| 9,389,007 B1 | | 7/2016 | McKay |
| 9,415,660 B2 | | 8/2016 | Koelsch |
| 9,464,839 B2 | | 10/2016 | Rusignuolo et al. |
| 9,557,100 B2 | * | 1/2017 | Chopko ............... B60H 1/3211 |
| 9,586,458 B2 | | 3/2017 | Larson et al. |
| 9,707,844 B2 | | 7/2017 | Arnold et al. |
| 9,758,013 B2 | | 9/2017 | Steele |
| 9,975,403 B2 | | 5/2018 | Rusignuolo et al. |
| 10,046,641 B2 | | 8/2018 | Penmetsa et al. |
| 2003/0106332 A1 | * | 6/2003 | Okamoto ............. F25B 27/00 62/239 |
| 2006/0030450 A1 | | 2/2006 | Kyle |
| 2007/0131408 A1 | * | 6/2007 | Zeigler ............. B60H 1/00378 62/236 |
| 2009/0133419 A1 | * | 5/2009 | Matsuno ............. B60P 3/20 62/239 |
| 2010/0045105 A1 | | 2/2010 | Bovio et al. |
| 2011/0031051 A1 | | 2/2011 | George |
| 2012/0319472 A1 | * | 12/2012 | Arnold ............. B60H 1/00428 307/9.1 |
| 2015/0246593 A1 | | 9/2015 | Larson et al. |
| 2017/0292759 A1 | | 10/2017 | Al-Hallaj et al. |
| 2017/0349078 A1 | | 12/2017 | Dziuba et al. |
| 2018/0001731 A1 | * | 1/2018 | Vehr ............... B60H 1/3211 |
| 2018/0001739 A1 | | 1/2018 | Vehr et al. |
| 2018/0245825 A1 | | 8/2018 | Koelsch |
| 2018/0264951 A1 | | 9/2018 | Kooi |

FOREIGN PATENT DOCUMENTS

| | | |
|---|---|---|
| EP | 2128545 A1 | 10/2013 |
| EP | 2436543 B1 | 9/2018 |
| JP | 2004274920 A | 9/2004 |
| WO | 2018005988 A1 | 1/2018 |
| WO | 2018226389 A1 | 12/2018 |
| WO | 2020068450 A1 | 4/2020 |

OTHER PUBLICATIONS

Refrigerated Transporter. Wedway reefer power system generates zero emissions. Apr. 25, 2013. Retrieved from https://www.refrigeratedtransporter.com/emissions/wedway-reefer-power-system-generates-zero-emissions. 3 Pages.

Written Opinion for International Application No. PCT/US2019/050958; Application Filing Date: Sep. 13, 2019; dated Dec. 16, 2019; 11 pages.

* cited by examiner

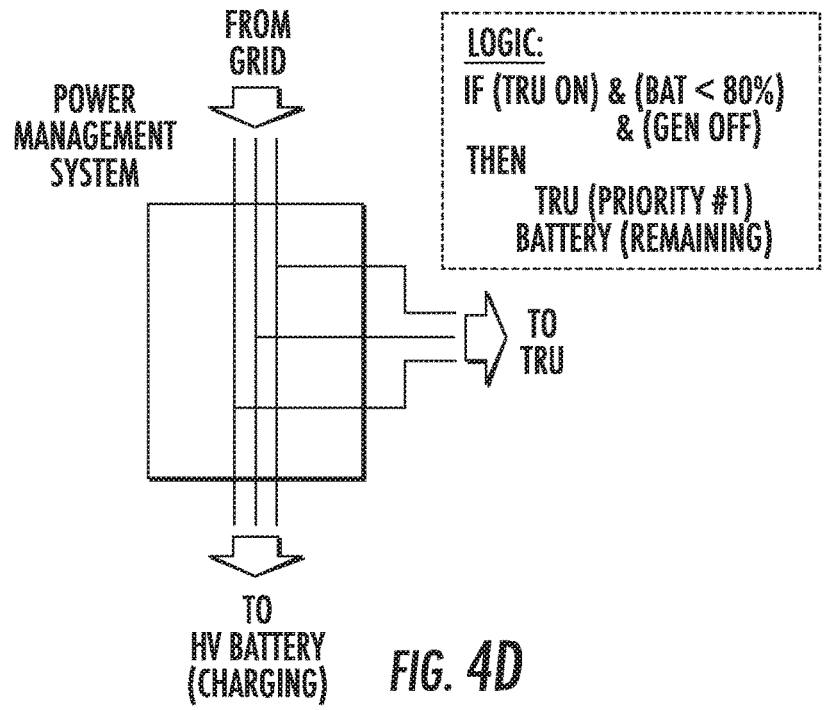
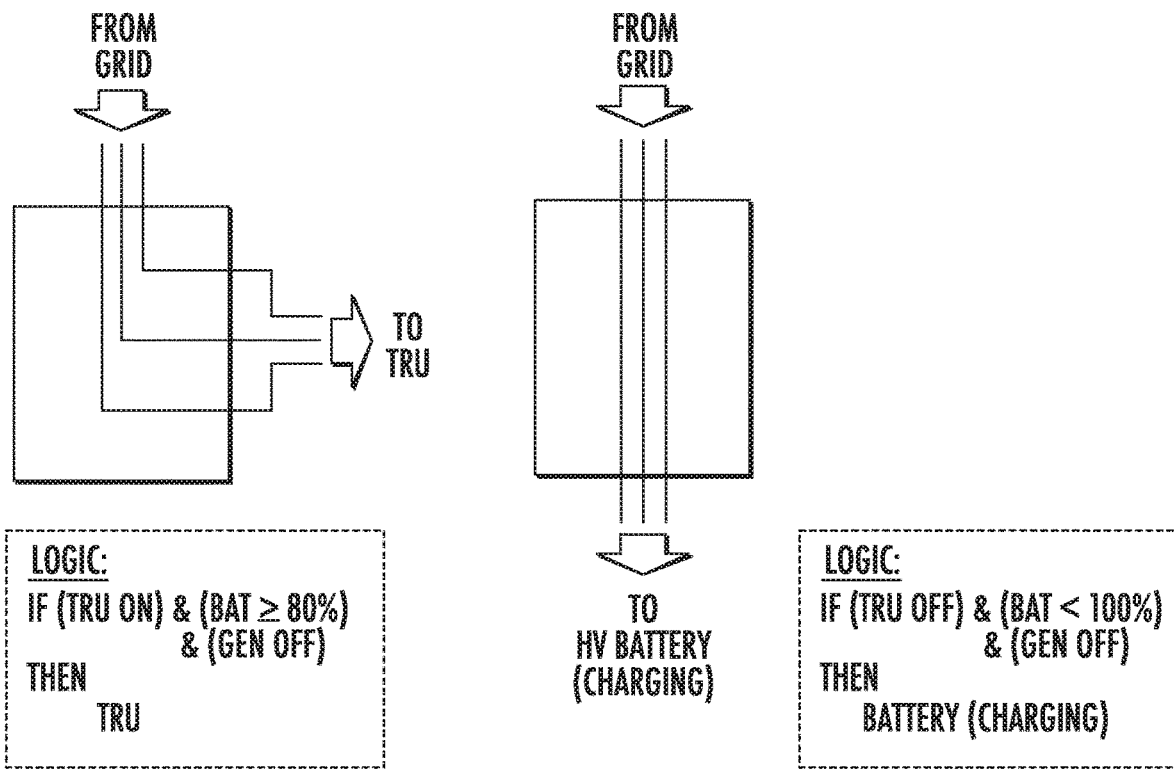
FIG. 4D
FIG. 4E
FIG. 4F

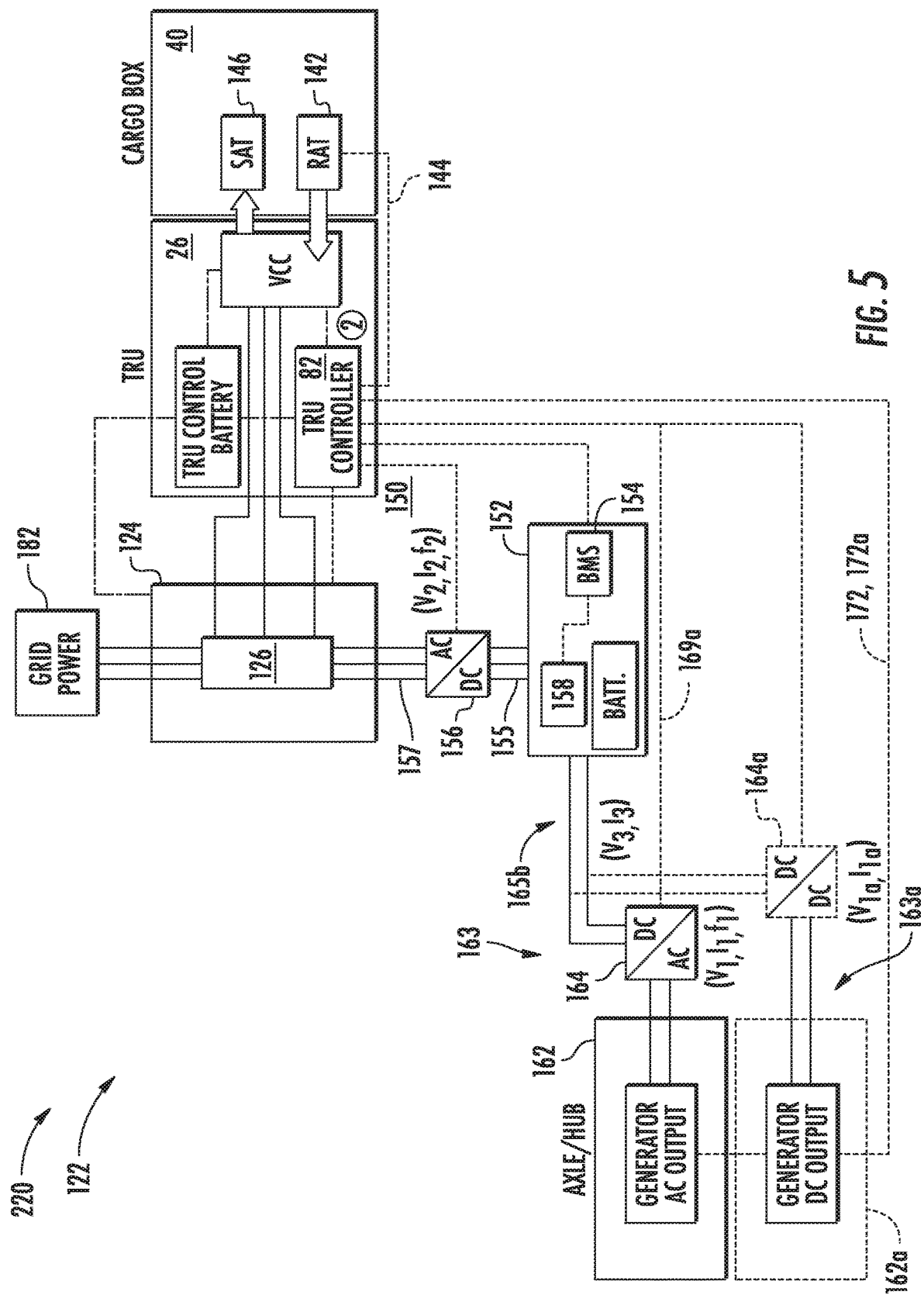

TRANSPORTATION REFRIGERATION UNIT WITH DC GENERATOR CHARGING OF PRIME MOVER ENERGY STORAGE DEVICE

CROSS REFERENCE TO RELATED APPLICATIONS

This application is a National Stage application of International Application No. PCT/US2019/050958, filed Sep. 13, 2019, which claims the benefit of U.S. Provisional Application No. 62/738,671, filed Sep. 28, 2018, both of which are incorporated by reference in their entirety herein.

BACKGROUND

The subject matter disclosed herein generally relates to transportation refrigeration units, and more specifically to an apparatus and a method for powering transportation refrigeration unit with a generator and an energy storage device.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, which in-turn drives the compressor.

With current environmental trends, improvements in transportation refrigeration units are desirable particularly toward aspects of efficiency, sound and environmental impact. With environmentally friendly refrigeration units, improvements in reliability, cost, and weight reduction is also desirable.

BRIEF SUMMARY

According to one embodiment, described herein is transportation refrigeration unit (TRU) and power system. The TRU and power system including a compressor configured to compress a refrigerant, the compressor having compressor motor configured to drive the compressor, an evaporator heat exchanger operatively coupled to the compressor, and an evaporator fan configured to provide return airflow from a return air intake and flow the return airflow over the evaporator heat exchanger. The TRU and power system also includes a return air temperature (RAT) sensor disposed in the return airflow and configured measure the temperature of the return airflow, a TRU controller operably connected to the RAT sensor and configured to execute a process to determine an AC power requirement for the TRU based on at least the RAT. Furthermore, the TRU and power system also includes a generator power converter, the generator power converter configured to receive a first DC power provided by a DC generator and transmit a second DC power, an energy storage system configured to receive the second DC power and provide/receive a three phase AC power, and a power management system configured to receive the three phase AC power and direct at least a portion of the three phase AC power the TRU based on the AC power requirement.

In addition to one or more of the features described above, or as an alternative, further embodiments may include a grid power source configured to provide grid three phase AC power to the power management system.

In addition to one or more of the features described above, or as an alternative, further embodiments may include that the generator power converter includes a DC/DC converter and the first DC power exhibits a first DC voltage and a first DC current, and the second DC power exhibits a second DC voltage and a second DC current.

In addition to one or more of the features described above, or as an alternative, further embodiments may include that the generator power converter is operably connected to the TRU controller, the generator power converter including a voltage control function, a current control function, wherein at least the voltage control function is responsive to the AC power requirement.

In addition to one or more of the features described above, or as an alternative, further embodiments may include that the energy storage system includes an energy storage device, a switching device, and at least one of an DC/AC converter configured to provide another three phase AC power to the power management system based on the AC power requirement and an AC/DC converter configured to convert at least a portion of the three phase AC power to supply the energy storage device.

In addition to one or more of the features described above, or as an alternative, further embodiments may include that the switching device is configured to direct DC power flows in the energy storage system based on the AC power requirement, the directing including directing the second DC voltage to at least one of the energy storage device and the DC/AC converter and DC/AC converter, directing DC power from the energy storage device to the DC/AC converter, and receiving DC power from the AC/DC converter and providing it to the energy storage device.

In addition to one or more of the features described above, or as an alternative, further embodiments may include that the energy storage device comprises at least one of a battery, fuel cell, and flow battery.

In addition to one or more of the features described above, or as an alternative, further embodiments may include a battery management system operably connected to the TRU controller and configured to monitor at least a state of charge of the energy storage device.

In addition to one or more of the features described above, or as an alternative, further embodiments may include that the DC/AC converter and AC/DC converter are integrated and wherein the DC/AC converter or AC/DC converter is operably connected to the TRU controller and configured to direct power flows to the power management system and from the power management system based on at least one of the AC power requirement and the state of charge of the energy storage device.

In addition to one or more of the features described above, or as an alternative, further embodiments may include that the another three phase AC power is synchronized to match grid three phase AC power.

In addition to one or more of the features described above, or as an alternative, further embodiments may include that the power management system is configured to receive a three phase AC power from the energy storage system configured to provide a three phase AC power and a grid power connection configured to provide a three phase grid power to the power management system and wherein the power management system is configure to provide a selected three phase AC power to at least one of the TRU and the energy storage system.

In addition to one or more of the features described above, or as an alternative, further embodiments may include that the power management system comprises a power control switching device, the power control switching device responsive to the TRU controller and configured to direct a plurality of power flows in the TRU and power system, the plurality of power flows based on at least the AC power requirement, a state of charge of an energy storage device of the energy storage system.

In addition to one or more of the features described above, or as an alternative, further embodiments may include that a first portion of power flows of the plurality of power flows receiving a grid three phase AC power from the grid if the grid power source is operative, and directing at least a portion of the grid three phase AC power to the TRU and energy storage system if the TRU is operative and an energy storage device of the energy storage system exhibits a state of charge less than a selected threshold or directing at least a portion of the grid three phase AC power to the TRU, if the TRU is operative and an energy storage device of the energy storage system exhibits a state of charge greater than or equal to about the selected threshold, or directing at least a portion of the grid three phase AC power to the energy storage system if the TRU is not operative and an energy storage device of the energy storage system exhibits a state of charge less than a second selected threshold.

In addition to one or more of the features described above, or as an alternative, further embodiments may include that a second portion of power flows of the plurality of power flows include receiving a three phase AC power from the energy storage systems, receiving a grid three phase AC power from the grid power source if the grid AC power source is operative, synchronizing and combining the three phase AC power from the energy storage system and the grid three phase AC power, and directing the combined three phase AC power to the TRU if the TRU is operative and an energy storage device of the energy storage system exhibits a state of charge greater than or equal to about another selected threshold.

Also described herein in another embodiment is a method if generating and directing power to a transportation refrigeration unit (TRU) system having a compressor configured to compress a refrigerant, an evaporator heat exchanger operatively coupled to the compressor; an evaporator fan configured to provide return airflow from a return air intake and flow the return airflow over the evaporator heat exchanger; a return air temperature (RAT) sensor disposed in the return airflow and configured measure the temperature of the return airflow; and a TRU controller. The method also includes operably connected to the RAT sensor to the TRU controller, determining an AC power requirement for the TRU based on at least the RAT, a operably connecting a generator power converter to the DC generator, the generator power converter configured to receive a first DC power provided by a DC generator and transmit a second DC power, operably connecting an energy storage system, the energy storage system operable to receive the second DC power and provide/receive a three phase AC power, and operably connecting a power management system to the generator power converter and the TRU, the power management system configured receive the second three phase AC power to direct power the TRU based at least on the AC power requirement.

In addition to one or more of the features described above, or as an alternative, further embodiments may include operably connecting a grid power source to provide grid three phase AC power to the power management system.

In addition to one or more of the features described above, or as an alternative, further embodiments may include that the generator power converter includes a DC/DC converter and the first DC power exhibits a first DC voltage and a first DC current, and the second DC power exhibits a second DC voltage and a second DC current.

In addition to one or more of the features described above, or as an alternative, further embodiments may include that the energy storage system comprises an energy storage device, a switching device, and at least one of an DC/AC converter configured to provide another three phase AC power to the power management system based on the AC power requirement and an AC/DC converter configured to convert at least a portion of the three phase AC power to supply the energy storage device.

In addition to one or more of the features described above, or as an alternative, further embodiments may include that configuring the switching device to direct DC power flows in the energy storage system based on the AC power requirement. The directing includes applying the second DC voltage to at least one of the energy storage device and the DC/AC converter and DC/AC converter, applying DC power from the energy storage device to the DC/AC converter, and receiving DC power from the AC/DC converter and providing it to the energy storage device.

In addition to one or more of the features described above, or as an alternative, further embodiments may include configuring the power management system with a power control switching device, the power control switching device responsive to the TRU controller and configured to direct a plurality of power flows in the TRU and power system, the plurality of power flows based on at least the AC power requirement, a state of charge of an energy storage device of the energy storage system.

In addition to one or more of the features described above, or as an alternative, further embodiments may include that the energy storage device includes a battery system.

Technical effects of embodiments of the present disclosure include a transportation refrigeration unit coupled to and powered by an external generator system via a generator power converter, where the power generated by the generator and converted by the generator power converter is based on an AC power requirement of the transportation refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike:

FIG. 4D depicts power flows of the power management system, according to an embodiment of the present disclosure;

FIG. 4E depicts power flows of the power management system, according to an embodiment of the present disclosure;

FIG. 4F depicts power flows of the power management system, according to an embodiment of the present disclosure;

FIG. 5 is a block diagram of a transportation refrigeration unit and power system, according to an embodiment of the present disclosure.

DETAILED DESCRIPTION

A detailed description of one or more embodiments of the disclosed apparatus and method are presented herein by way of exemplification and not limitation with reference to the Figures.

Figure 1:
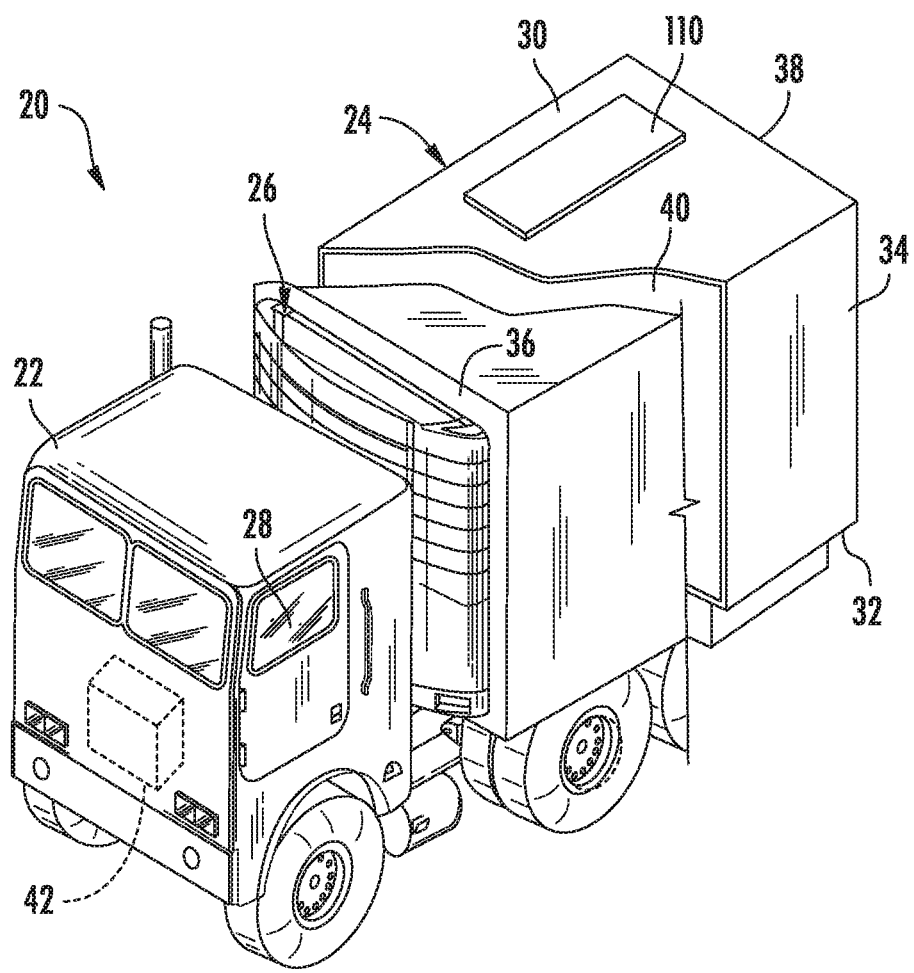
FIG. 1 is a perspective view of a transportation refrigeration system having a transportation refrigeration unit as one, non-limiting, according to an embodiment of the present disclosure.

Referring to FIG. 1, a transport refrigeration system 20 of the present disclosure is illustrated. In the illustrated embodiment, the transport refrigeration systems 20 may include a tractor or vehicle 22, a container 24, and a transportation refrigeration unit (TRU) 26. The container 24 may be pulled by a vehicle 22. It is understood that embodiments described herein may be applied to shipping containers that are shipped by rail, sea, air, or any other suitable container, thus the vehicle may be a truck, train, boat, airplane, helicopter, etc.

The vehicle 22 may include an operator's compartment or cab 28 and a combustion engine 42 which is part of the powertrain or drive system of the vehicle 22. In some instances the vehicle 22 may be a hybrid or all electric configuration having electric motors to provide propulsive force for the vehicle. In some configurations the TRU system 26 may be engineless. In some embodiments, a small engine or the engine of the vehicle 22 may be employed to power or partially power the TRU 26. The container 24 may be coupled to the vehicle 22 and is thus pulled or propelled to desired destinations. The trailer may include a top wall 30, a bottom wall 32 opposed to and spaced from the top wall 30, two side walls 34 spaced from and opposed to one-another, and opposing front and rear walls 36, 38 with the front wall 36 being closest to the vehicle 22. The container 24 may further include doors (not shown) at the rear wall 38, or any other wall. The walls 30, 32, 34, 36, 38 together define the boundaries of a cargo compartment 40. Typically, transport refrigeration systems 20 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the TRU 26 is associated with a container 24 to provide desired environmental parameters, such as, for example temperature, pressure, humidity, carbon dioxide, ethylene, ozone, light exposure, vibration exposure, and other conditions to the cargo compartment 40. In further embodiments, the TRU 26 is a refrigeration system capable of providing a desired temperature and humidity range.

Figure 2:
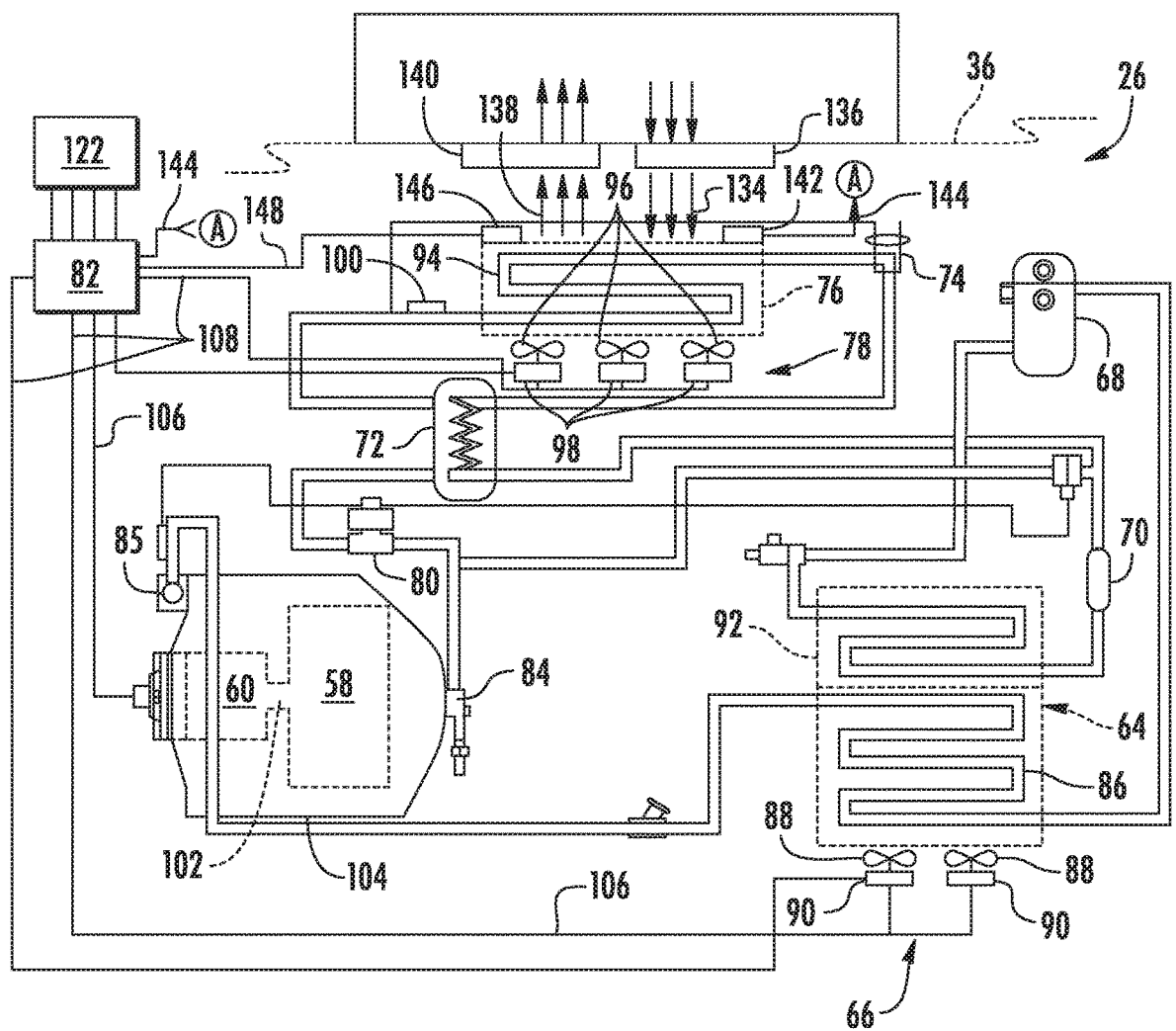
FIG. 2 is a schematic of the transportation refrigeration unit, according to an embodiment of the present disclosure.

Referring to FIGS. 1 and 2, the container 24 is generally constructed to store a cargo (not shown) in the compartment 40. The TRU 26 is generally integrated into the container 24 and may be mounted to the front wall 36. The cargo is maintained at a desired temperature by cooling of the compartment 40 via the TRU 26 that circulates refrigerated airflow into and through the cargo compartment 40 of the container 24. It is further contemplated and understood that the TRU 26 may be applied to any transport compartments (e.g., shipping or transport containers) and not necessarily those used in tractor trailer systems. Furthermore, the transport container 24 may be a part of the of the vehicle 22 or constructed to be removed from a framework and wheels (not shown) of the container 24 for alternative shipping means (e.g., marine, railroad, flight, and others).

The components of the TRU 26 may include a compressor 58, an electric compressor motor 60, a condenser 64 that may be air cooled, a condenser fan assembly 66, a receiver 68, a filter dryer 70, a heat exchanger 72, an expansion valve 74, an evaporator 76, an evaporator fan assembly 78, a suction modulation valve 80, and a controller 82 that may include a computer-based processor (e.g., microprocessor) and the like as will be described further herein. Operation of the TRU 26 may best be understood by starting at the compressor 58, where the suction gas (e.g., natural refrigerant, hydro-fluorocarbon (HFC) R-404a, HFC R-134a . . . etc.) enters the compressor 58 at a suction port 84 and is compressed to a higher temperature and pressure. The refrigerant gas is emitted from the compressor 58 at an outlet port 85 and may then flow into tube(s) 86 of the condenser 64.

Air flowing across a plurality of condenser coil fins (not shown) and the tubes 86, cools the gas to its saturation temperature. The air flow across the condenser 64 may be facilitated by one or more fans 88 of the condenser fan assembly 66. The condenser fans 88 may be driven by respective condenser fan motors 90 of the fan assembly 66 that may be electric. By removing latent heat, the refrigerant gas within the tubes 86 condenses to a high pressure and high temperature liquid and flows to the receiver 68 that provides storage for excess liquid refrigerant during low temperature operation. From the receiver 68, the liquid refrigerant may pass through a sub-cooler heat exchanger 92 of the condenser 64, through the filter-dryer 70 that keeps the refrigerant clean and dry, then to the heat exchanger 72 that increases the refrigerant sub-cooling, and finally to the expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized and thereby cools the return air.

The evaporator fan assembly 78 includes one or more evaporator fans 96 that may be driven by respective fan motors 98 that may be electric. The air flow across the evaporator 76 is facilitated by the evaporator fans 96. From the evaporator 76, the refrigerant, in vapor form, may then flow through the suction modulation valve 80, and back to the compressor 58. The expansion valve 74 may be thermostatic or electrically adjustable. In an embodiment, as depicted, the expansion valve 74 is thermostatic. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for HFCs such as R-404a and R-134a and natural refrigerants such as propane and ammonia. Other refrigerant systems may also be applied that use carbon dioxide ($CO_2$) refrigerant, and that may be a two-stage vapor compression system. In another embodiment, the expansion valve 74 could be an electronic expansion valve. In this case the expansion valve is commanded to a selected position by the controller 82 based on the operating conditions of the vapor compression cycle and the demands of the system.

A bypass valve (not shown) may facilitate the flash gas of the refrigerant to bypass the evaporator 76. This will allow the evaporator coil to be filled with liquid and completely 'wetted' to improve heat transfer efficiency. With $CO_2$ refrigerant, this bypass flash gas may be re-introduced into a mid-stage of a two-stage compressor 58.

The compressor 58 and the compressor motor 60 may be linked via an interconnecting drive shaft 102. The compressor 58, the compressor motor 60 and the drive shaft 102 may all be sealed within a common housing 104. The compressor 58 may be a single compressor. The single compressor may be a two-stage compressor, a scroll-type compressor or other compressors adapted to compress HFCs or natural refrigerants. The natural refrigerant may be $CO_2$, propane, ammonia, or any other natural refrigerant that may include a global-warming potential (GWP) of about one (1).

Continuing with FIG. 2, with continued reference to FIG. 1. FIG. 2 also illustrates airflow through the TRU 26 and the cargo compartment 40. Airflow is circulated into and through and out of the cargo compartment 40 of the container 24 by means of the TRU 26. A return airflow 134 flows into the TRU 26 from the cargo compartment 40 through a return air intake 136, and across the evaporator 76 via the fan 96, thus conditioning the return airflow 134 to a selected or predetermined temperature. The conditioned return airflow 134, now referred to as supply airflow 138, is supplied into the cargo compartment 40 of the container 24 through the refrigeration unit outlet 140, which in some embodiments is located near the top wall 30 of the container 24. The supply airflow 138 cools the perishable goods in the cargo compartment 40 of the container 24. It is to be appreciated that the TRU 26 can further be operated in reverse to warm the container 24 when, for example, the outside temperature is very low.

A temperature sensor 142 (i.e., thermistor, thermocouples, RTD, and the like) is placed in the air stream, on the evaporator 76, at the return air intake 136, and the like, to monitor the temperature return airflow 134 from the cargo compartment 40. A sensor signal indicative of the return airflow temperature denoted RAT is operably connected via line 144 to the TRU controller 82 to facilitate control and operation of the TRU 26. Likewise, a temperature sensor 146 is placed in the supply airflow 138, on the evaporator 76, at the refrigeration unit outlet 140 to monitor the temperature of the supply airflow 138 directed into the cargo compartment 40. Likewise, a sensor signal indicative of the supply airflow temperature denoted SAT 14 is operably connected via line 148 to the TRU controller 82 to facilitate control and operation of the TRU 26.

System

Figure 3:
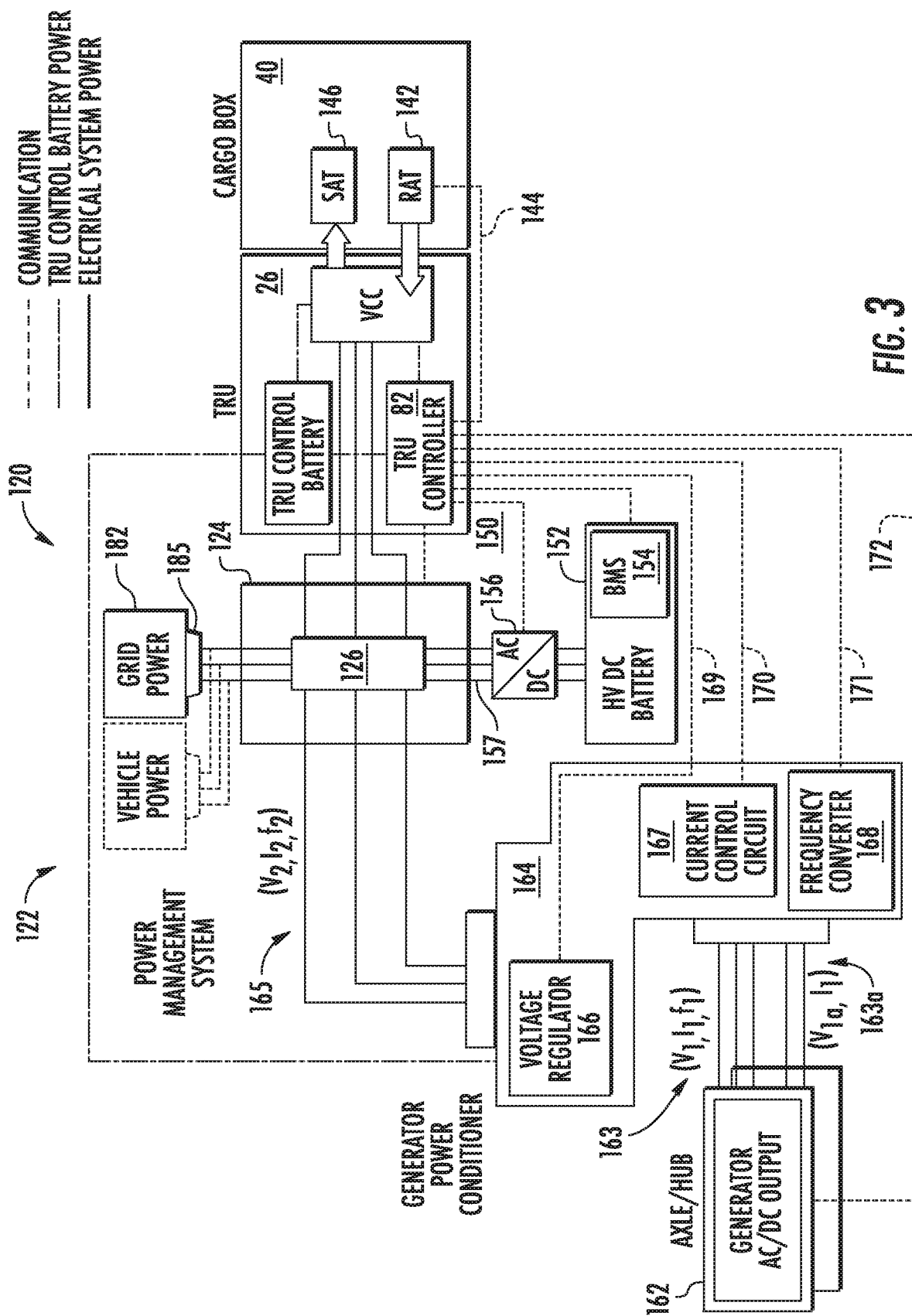
FIG. 3 is a block diagram of a transportation refrigeration unit and power system, according to an embodiment of the present disclosure.

Referring now to FIG. 3, with continued reference to FIGS. 1 and 2 as well, the TIW 26 may include or be operably interfaced with a power supply interface shown generally as 120. The power supply interface 120 may include, interfaces to various power sources denoted generally as 122 and more specifically as follows herein for the TRU 26 and the components thereof. In an embodiment the power sources 122 may include, but not be limited to an energy storage device 152, generator 162, and grid power, 182. Each of the power sources 122 may be configured to selectively power the TRU 26 including compressor motor 60, the condenser fan motors 90, the evaporator fan motors 98, the controller 82, and other components 99 of the TRU 26 that may include various solenoids and/or sensors). The controller 82 through a series of data and command signals over various pathways 106 and 108 may, for example, control the application of power to the electric motors 60, 90, 98 as dictated by the cooling needs of the TIW 26.

The TRU 26 may include an AC or DC architecture with selected components employing alternating current (AC), and others employing direct current (DC). For example, in an embodiment, the motors 60, 90, 98 may be configured as AC motors, while in other embodiments, the motors 60, 90, 98 may be configured as DC motors. The operation of the of the power sources 122 as they supply power to the TRU 26 may be managed and monitored by power management system 124. The power management system 124 is configured to determine a status of various power sources 122, control their operation, and direct the power to and from the various power sources 122 and the like based on various requirements of the TRU 26. In an embodiment, the TRU controller 82 receives various signals indicative of the operational state of the TRU 26 and determines the power requirements for the TRU system 26 accordingly and directs the power supply interface 120 and specifically the power management system 124 to direct power accordingly to address the requirements of the TRU 26. In one embodiment, the TRU system 26 is controlled to a temperature setpoint value selected by the user. The TRU controller 82 monitors the RAT and optionally the SAT as measured by the temperature sensors 142 and 146 respectively. The TRU controller 82 estimates the power requirements for the TRU 26 based on the RAT (among others) and provides commands accordingly to the various components of the power supply interface 120 and specifically the power management system 124, energy storage system 150, and generator power converter 164 to manage the generation, conversion, and routing of power in the power supply interface 120 and TRU system 26. By using the measured RAT and the setpoint value, an estimate to power demand is made. More specifically, in one embodiment, if the (RAT-setpoint value) is above a first threshold (e.g., >10 degrees F.), then full power (e.g., at a known voltage supply, current demand is known) is needed by the TRU system 26. If the (RAT-setpoint value) is between first threshold and second threshold, current requirement is limited (at known voltage) to achieve a mid-range power (e.g., ~50% power or something less than 100%). If the (RAT-setpoint value) is below second threshold, current is limited (at voltage) to achieve a minimum power (e.g., ~20% power).

The TRU controller 82 is configured to control the components in the TRU 26 as well as the components of the power supply interface 120 in accordance with operating needs of the transport refrigeration system 20. The TRU controller 82 is communicatively coupled to the power management system 124, DC/AC converter 156, battery management system 154 and the generator power converter 164 components of voltage regulator 166, current control circuit 167, frequency converter 168 and the generator 162. For the TRU power demand, the TRU controller 82, using additional information from the BMS 154 and generator 162, provide instructions to affect the generator output to the power form required by the TRU 26. Additionally, the TRU controller 82 provides instructions to manage the power flow via the power management system 124 depending upon the operational status of the various power sources (i.e. grid power 182, energy storage device 152 and generator 162) as coupled with the TRU 26 power demand.

As described further herein, there are three power sources 122—grid power 182, generator 162/generator power converter 164 and energy storage device 152. If the TRU 26 is "On" and operating, the TRU controller 82 knows, the power requirements for the TRU system, and thereby, what power is needed. The TRU controller 82 is also programmed to ascertain whether or not grid power (e.g., 182) is available or not. If the grid power is available and TRU is On and energy storage device 152 (e.g., battery) SOC indicates a full charge, grid power will satisfy TRU system 26 power demand Conversely, if grid power 182 is available and TRU On and the energy storage device is not fully charged, TRU power demand is satisfied as first priority and then DC/AC inverter 156 is be activated to provide necessary charging to energy storage device 152 as second priority. Moreover, if grid power 182 is available and TRU is "Off" and the energy storage device 152 is not fully charged, the DC/AC inverter 156 will be activated to provide necessary charging current. If grid power 182 is not available and generator/generator power converter 162/164 is not operable, all TRU power demand is satisfied by the energy storage system 150 via the energy storage device. Finally, if grid power 182 is not available and generator/generator power converter 162/164 is operable, then TRU power demand is satisfied by both the generator 162 & energy storage system 150.

The power management system 124 receives power from a generator 162 directly and/or via a generator power converter 164. In an embodiment, the power management system 124 may be may be a stand-alone unit, integral with the generator power converter 164, and/or integral with the TRU 26. The generator 162 can be axle or hub mounted configured to recover rotational energy when the transport refrigeration system 20 is in motion and convert that rotational energy to electrical energy, such as, for example, when the axle of the vehicle 22 is rotating due to acceleration, cruising, or braking. In an embodiment, the generator 162 is configured to provide a first three phase AC power 163 comprising voltage $V_1$, an AC current $I_1$ at a given frequency $f_1$ denoted by reference numeral 163. The generator 162 may be asynchronous or synchronous. In another embodiment, the generator 162 may be DC, providing a first DC power 163a including a DC voltage and DC current denoted as $V_{1a}$, and DC current $I_{1a}$. The generator power converter 164 in one or more embodiments generates a second three phase AC power 165 including AC voltage $V_2$, a second AC current $I_2$ at a selected frequency $f_2$ and is transmitted from the generator power converter 164 to the power management system 124 or otherwise as described herein.

As described herein, in operation, the TRU controller 82 identified the power requirements for the TRU 26 at least partially based on the RAT. The TRU controller 82 conveys the power requirements to the power management system 124 and/or the generator power converter 164 to convert the first three phase AC power 163 or first DC power 163a to the second three phase AC power 165 as necessary to satisfy the requirements of the TRU 26.

AC Gen/AC Converter

In an embodiment, the generator power converter 164 is an AC/AC converter and configured to receive the three phase AC power 163 (e.g., at AC voltage $V_1$, AC current $I_1$ a frequency $f_1$), from the generator 162 and convert it to a second three phase AC power denoted 165 comprising the second three phase AC voltage $V_2$, a second AC current $I_2$ at a selected frequency $f_2$. The second three phase AC power 165 is transmitted from the generator power converter 164 to the power management system 124. The generator power converter 164 is configured to provide the second three phase AC power 165 based of the operating requirements of the TRU 26. In an embodiment, the generator power converter 164 includes a voltage control function 166, a current control function 167, and frequency converter function 168, each configured to facilitate the conversion. In one or more embodiments, the TRU controller 82 provides command signals denoted 169, 170, and 171 to a voltage control function 166, current control function 167, and frequency converter function 168 respectively. The command signals 169, 170, and 171 are generated by the TRU controller 82 based on the power consumption requirements of the TRU 26 as discussed further herein. In addition, the TRU controller 82 may receive status information as depicted by 172 regarding the generator 162, generator power converter 164, or the power management system 124 for mode selection and diagnostic purposes. The generator power converter 164 may be a stand-alone unit configured to be in close proximity to or even integral with the generator 162. In another embodiment, the generator power converter 164 may be integral with the power management system 124 and/or the TRU 26.

Continuing with FIG. 3 and the generator power converter 164, in an embodiment, the voltage control function 166 includes a voltage regulation function and is configured to monitor the output voltage from the generator 162 and maintains a constant voltage out of the voltage control function 166. The voltage control function 166 communicates status to the TRU Controller 82. The current control function 167 monitors and communicates to the TRU 26 the status of current draw from the generator 162. In an embodiment, the current may be limited depending on the power demands of the TRU 26. Finally, the frequency converter function 168 monitors the frequency of the three phase power 163 produced by the generator 162 and converts the three phase power 163 to the three phase power 165 exhibiting the desired frequency as determined by the voltage control function 166 and the TRU controller 82, for supply to the power management system 124 and ultimately the TRU 26. In an embodiment the communications may be over standard communication interfaces such as CAN, RS-485, and the like. Moreover, as is discussed further herein, the communications may be wired or wireless.

DC Gen/AC Converter

In another embodiment, for example, when the generator 162 is a DC generator, the generator power converter 164 is an DC/AC converter and configured to receive DC power 163a (e.g., at DC voltage $V_{1a}$, DC current $I_{1a}$), from the generator 162 and convert it to the second three phase AC power 165 comprising a second three phase AC voltage $V_2$, a second AC current $I_2$ at a selected frequency $f_2$. The second three phase AC power 165 is transmitted from the generator power converter 164 to the power management system 124 as described herein. Once again, as described above, the generator power converter 164 is configured to provide the second three phase AC power 165 based of the requirements of the TRU 26 as described above. In this embodiment, the generator power converter 164 including the voltage control function 166, the current control function 167, and frequency converter function 168, are ach configured to facilitate the DC/AC conversion. In this embodiment, once again the TRU controller 82 provides command signals denoted 169, 170, and 171 to a voltage control function 166, current control function 167, and frequency converter function 168 respectively, based on the power consumption requirements of the TRU 26 as discussed further herein. In this embodiment, the voltage control function 166 includes a voltage regulation function and is configured to monitor the output DC voltage from the generator 162 and maintains a constant AC voltage out of the voltage control function 166. The current control function 167 monitors and communicates to the TRU 26 the status of current draw from the generator 162. Finally, the frequency converter function 168 monitors the frequency of the three phase power 165 produced by the generator converter 164 to ensure it exhibits the desired frequency as determined by the voltage control function 166 and the TRU controller 82, for supply to the power management system 124 and ultimately the TRU 26.

Energy Storage System

Continuing with FIG. 3 and the architecture of the power supply interface 120 and the various power sources 122 employed to power the TRU 26 and the components thereof. In an embodiment, one of the power sources 122 may include, but not be limited to an energy storage system 150 operably coupled to the power management system 124. As described herein, another power source 122 that the power management system 124 receives power from is the generator 162, whether directly and/or via a generator power converter 164. Furthermore, the grid power source 182 provides three phase AC power to the power management system 124 under selected conditions. The energy storage system 150 transmits three phase power 157 to and receives power from the power management system 124. The energy storage system 150 may include, but not be limited to the energy storage device 152, and AC/DC converter 156 and a battery management system 154. In one embodiment, the power management system 124 provides three phase AC power 157 to an AC/DC converter 156 to formulate a DC voltage and current to charge and store energy on the energy storage device 152. Conversely, in other embodiments the energy storage device 152 supplies DC voltage and current to the AC/DC converter 156 operating as a DC/AC converter to supply a three phase AC power 157 for powering the TRU 26.

The battery management system 154 monitors the performance of the energy storage device 152. For example, monitoring the state of charge of the energy storage device 152, a state of health of the energy storage device 152, and a temperature of the energy storage device 152. Examples of the energy storage device 152 may include a battery system (e.g., a battery or bank of batteries), fuel cells, flow battery, and others devices capable of storing and outputting electric energy that may be direct current (DC). The energy storage device 152 may include a battery system, which may employ multiple batteries organized into battery banks through which cooling air may flow for battery temperature control, as described in U.S. patent application Ser. No. 62/616,077, filed Jan. 11, 2018, the contents of which are incorporated herein in their entirety.

If the energy storage system 150 includes a battery system for the energy storage device 152, the battery system may have a voltage potential within a range of about two-hundred volts (200V) to about six-hundred volts (600V). Generally, the higher the voltage, the greater is the sustainability of electric power which is preferred. However, the higher the voltage, the greater is the size and weight of for example, batteries in an energy storage device 152, which is not preferred when transporting cargo. Additionally, if the energy storage device 152 is a battery, then in order to increase either voltage and/or current, the batteries need to be connected in series or parallel depending upon electrical needs. Higher voltages in a battery energy storage device 152 will require more batteries in series than lower voltages, which in turn results in bigger and heavier battery energy storage device 152. A lower voltage and higher current system may be used, however such a system may require larger cabling or bus bars. In one embodiment, the energy storage device 152 may be contained within the structure of the TRU 26. In an embodiment, the energy storage device 152 is located with the TRU 26, however, other configurations are possible. In another embodiment, the energy storage device 152 may be located with the container 24 such as, for example, underneath the cargo compartment 40. Likewise, the AC/DC converter 156 may be located with the container 24 such as, for example, underneath the cargo compartment 40, however, in some embodiments it may be desirable to have the AC/DC converter 156 in close proximity to the power management system 124 and/or the TRU 26 and TRU controller 82. It will be appreciated that in one or more embodiments, while particular locations are described with respect to connection and placement of selected components including the energy storage device 152 and/or AC/DC converter 156, such descriptions are merely illustrative and are not intended to be limiting. Varied location, arrangement and configuration of components is possible and within the scope of the disclosure.

The battery management system 154 and AC/DC converter 156 are operably connected to and interface with the TRU controller 82. The TRU controller 82 receives information regarding the status of energy storage system 150, including the energy storage device 152 to provide control inputs to the AC/DC converter 156 to monitor the energy storage device 152, control charge and discharge rates for the energy storage device 152 and the like.

Continuing with FIG. 3, as described earlier, the power supply interface 120 may include, interfaces to various power sources 122 managed and monitored by power management system 124. The power management system 124 manages and determines electrical power flows in the power supply interface 120 based upon the operational needs of the TRU 26 and the capabilities of the components in the power supply interface 120, (e.g., generator 162, converter 164, energy storage device 152, and the like. The power management system 124 is configured to determine a status of various power sources 122, control their operation, and direct the power to and from the various power sources 122 and the like based on various requirements of the TRU 26.

In an embodiment there are five primary power flows managed by the power management system 124. First, the power into the power management system 124 supplied via the generator 162 or generator power converter 164, e.g., second three phase AC power 165). Second, the power supplied to the power management system 124 when the TRU system 26 is operably connected to grid power source 182. Third the power supplied to the power management system 124 from an energy storage device 152. Fourth, the power directed from the power management system 124 to the energy storage device 152. Finally, the power directed to the TRU 26 from the power management system 124 for providing power to operate the TRU 26.

The power flows will be transferred through different paths based on the requirements placed on the power management system 124 and particular configuration of the power supply interface 120. The power management system 124 operates as a central power bus to connect various power sources 122 together to supply the power needs of the TRU 26. The power management system 124 controls switching, directing, or redirecting power to/from the five power flows as needed to satisfy the power requirements of the TRU 26. Switching, directing, and redirecting may readily be accomplished by employing a bus control switching device 126 of the power management system 124. The bus control switching device 126 may include, but not be limited to, electromechanical and solid state semiconductor switching devices including relays, contactors, solid state contactors as well as semiconductor switching devices such as transistors, FETs, MOSFETS, IGBT's, thyristors, SCR's, and the like. In addition, to facilitate and implement the functionality of the power management system 124, the voltages and frequencies of the power whether supplied by the grid power supply 182, generator 162, generator converter 164, or the AC/DC converter 156 of the energy storage system 150 need to be synchronized to provide a common power source to be supplied to the TRU 26 and/or charge the energy storage device 152. Current draw will be determined by the TRU 26 and the need to charge the energy storage device 152.

The generator power converter 164 output (the second three phase AC power 165) and/or grid power from the grid power source 182 and/or power directed to/from the energy storage system 150 is supplied to the bus control switching device 126 in an overlapping or break-before-make condition as determined by the bus control switching device 126 of the power management system. The AC/DC converter 156, when operating as a DC to AC converter synchronizes the voltage and frequency of the three phase power (e.g., 157) generated via the energy storage system 150 with the power connected bus control switching device 126 in order to transfer power from the energy storage device 152 to the power management system 124 (an thereby the TRU 26) as needed. Likewise, grid power from the grid power source 182 provided to the power management system 124 is directed by the bus control switching device 126 once connected and the AC/DC converter 156 monitor the bus voltage and frequency to determine if the above parameters are equal before connectivity is permitted. This will allow minimum disruption of the power bus system. In other words, anytime two or more power sources are available, the bus control switching device, and the AC/DC convert 156 ensure that power is matched and synchronized to enable connectivity. The power bus control device 126 communicates to the TRU controller 82 to determine status of flows connected. In an embodiment, the power management system 124, and or the TRU controller 82 provides visual indications of which source (e.g., grid power source 182, generator 162 or energy storage system 150) is selected and operating on the bus control switching device 126.

Figure 4A:
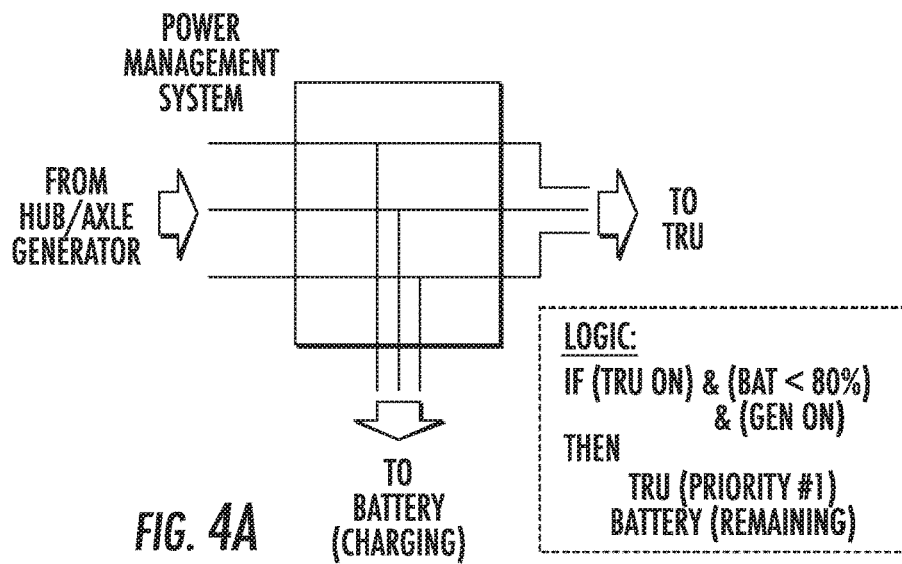
FIG. 4A depicts power flows of the power management system according to an embodiment of the present disclosure.
Figure 4B:
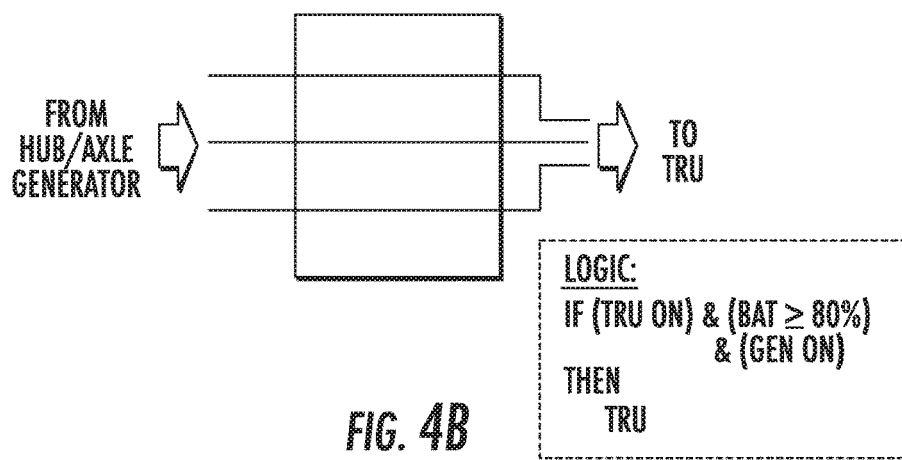
FIG. 4B depicts power flows of the power management system, according to an embodiment of the present disclosure.
Figure 4C:
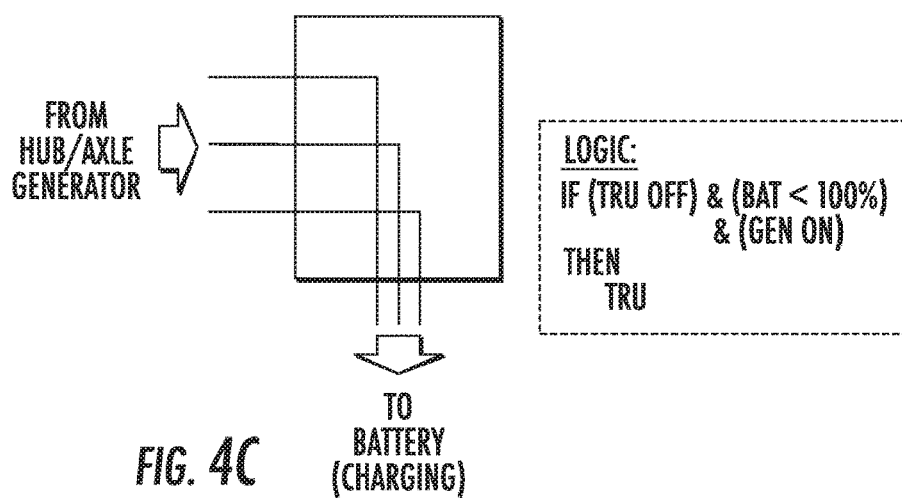
FIG. 4C depicts power flows of the power management system, according to an embodiment of the present disclosure.

Turning now to FIGS. 4A-4H each providing a simplified diagram depicting each of the eight identified power flows combinations. FIGS. 4A-4C depict power flows for power supplied from the generator 162 and/or generator power converter 164 (e.g., second three phase AC power). Referring to FIG. 4A, in an embodiment, the logic employed by the TRU controller 82 for directing the power in the power management system 124 determines if the TRU 26 is operating. If so, and the energy storage system 150 indicates that the energy storage device 120 is exhibiting a charge state that is less than a selected threshold, then the power management system 124 directs power to both the TRU 26 and the energy storage system 150 for recharging the energy storage device 152. In an embodiment, priority is given to satisfying the power requirements of the TRU 26. Any remaining power may be directed to the recharging application for the energy storage system 150. It should be appreciated that while particular threshold of 80% is disclosed and employed for the described embodiments, such values and description are merely illustrative. Other values and applications for the thresholds are possible.

Referring now to FIG. 4B as well, the figure depicts a second instance for power flows for power supplied from the generator 162 and/or generator power converter 164. In this embodiment, if the TRU 26 is operating, and the energy storage system 150 indicates that the energy storage device 152 is exhibiting a state of charge that is in excess of a selected threshold, then the power management system 124 directs power to only the TRU 26, (as the and the energy storage system 150 does not yet require recharging). Similarly, in yet another embodiment, as depicted by FIG. 4C, a third power flow governed by the power management system 124 for power supplied from the generator 162 and/or generator power converter 164. In this embodiment, the logic employed by the TRU controller 82 for directing the power in the power management system 124 addresses an instance when the TRU 26 is inoperative, and the energy storage system 150 indicates that the energy storage device 152 is exhibiting a state of charge that is less than a selected threshold (in this instance 100%, though other thresholds are possible). In this embodiment, the power management system 124 directs power to only to the energy storage system 150 for recharging the energy storage device 152. In an embodiment, priority is given to satisfying the power requirements of energy storage system 150 and secondarily to providing power to the TRU 26.

Turning now to FIGS. 4D-4F, which depict power flows for power supplied from the grid power source 182. In an embodiment as depicted in FIG. 4D, the logic employed by the TRU controller 82 for directing the power from the grid power source 182 in the power management system 124 determines if the TRU 26 is operating and the generator 162 (or the generator power converter 164) is inoperative. If so, and the energy storage system 150 indicates that the energy storage device 152 is exhibiting a charge state that is less than a selected threshold, then the power management system 124 directs power to both the TRU 26 and the energy storage system 150 for recharging the energy storage device 152. In an embodiment, once again, priority is given to satisfying the power requirements of the TRU 26. Any remaining power may be directed to the recharging application for the energy storage system 150. It should be appreciated that while particular threshold of 80% is disclosed and employed for the described embodiments, such values and description are merely illustrative. Other values and applications for the thresholds are possible.

Referring now to FIG. 4E as well, the figure depicts a second instance for power flows for power supplied from the grid power source 182 when the generator 162 is inoperative. In this embodiment, if the TRU 26 is operating, and the energy storage system 150 indicates that the energy storage device 152 is exhibiting a state of charge that is in excess of a selected threshold, then the power management system directs power to only the TRU 26, (as the energy storage system 150 does not yet require recharging). Similarly, in yet another embodiment, as depicted by FIG. 4F, a third power flow governed by the power management system 124 for power supplied from the grid power source 182 when the generator 162 is inoperative. In this embodiment, the logic employed by the TRU controller 82 for directing the power in the power management system 124 addresses an instance when the TRU 26 is also inoperative, and the energy storage system 150 indicates that the energy storage device 152 is exhibiting a state of charge that is less than a selected threshold (in this instance 100%, though other thresholds are possible). In this embodiment, the power management system 124 directs power to only to the energy storage system 150 for recharging the energy storage device 152. In an embodiment, priority is given to satisfying the power requirements of energy storage system 150.

Figure 4G:
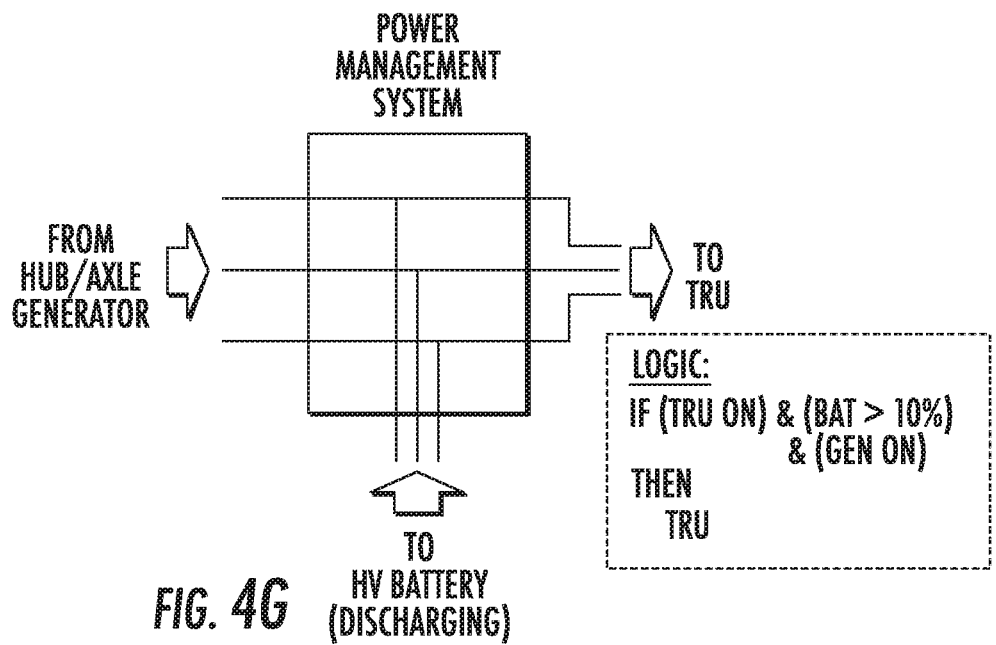
FIG. 4G depicts power flows of the power management system, according to an embodiment of the present disclosure.
Figure 4H:
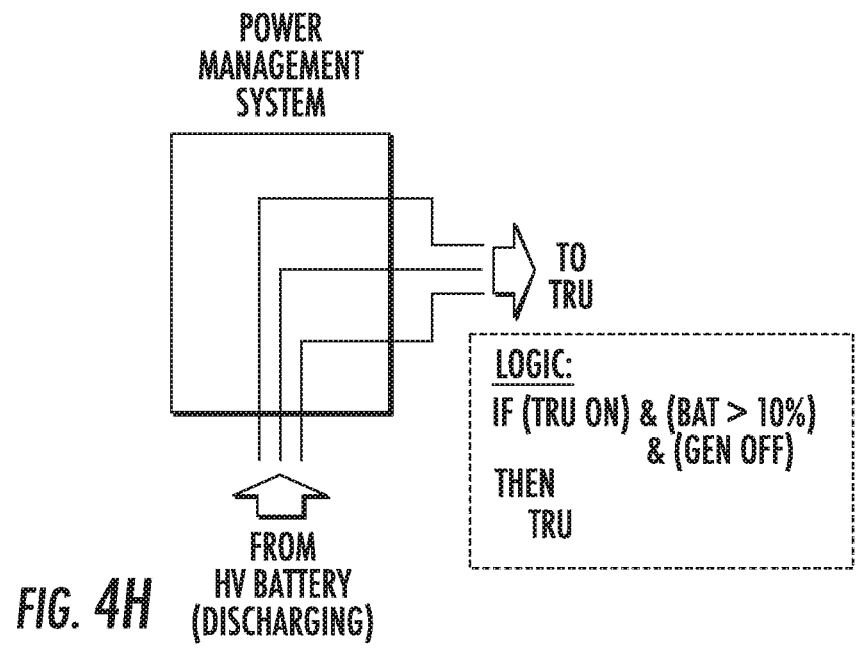
FIG. 4H depicts power flows of the power management system, according to an embodiment of the present disclosure.

Turning now FIGS. 4G and 4H, which depict power flows for power supplied to the TRU 26 under selected conditions for operating from the energy storage system 150 as well. In FIG. 4G power flows to the TRU 26 are provided from the generator 162 and/or generator power converter 164 (e.g., second three phase AC power 165) as well as from the energy storage system 150. In an embodiment, the logic employed by the TRU controller 82 for directing the power in the power management system 124 determines if the TRU 26 is operating. If so, and the energy storage system 150 indicates that the energy storage device 152 is exhibiting a charge state of greater than a selected threshold, then the power management system 124 directs power from both the generator 162 (or generator power converter 164) and the energy storage system 150 is directed to the TRU 26. In an embodiment a threshold of 10 percent is employed for the state of charge of the energy storage device 152. In this embodiment, power is provided by the energy storage system 150 and thereby discharging the energy storage device 152. In an embodiment, priority is given to satisfying the power requirements of the TRU 26. This embodiment may be employed under conditions where the output power of the generator 162 and/or generator power converter 164 is less that that needed to operate the TRU 26. It should be appreciated that while particular threshold of 10% is disclosed and employed for the described embodiments, such values and description are merely illustrative. Other values and applications for the thresholds are possible. For example, in some instances it may be desirable prioritize operation of the TRU 26 such that fully draining the energy storage device 152 is acceptable. Likewise, in other embodiments, it may be desirable to modify the function or curtail the operation of the TRU to avoid excessively discharging the energy storage device 152.

Referring now to FIG. 4H as well, the figure depicts a second instance for power flows from the energy storage system 150 alone. In this embodiment, if the TRU 26 is operating, but the generator 162 and/or the generator power converter 164 is inoperative, if the energy storage system 150 indicates that the energy storage device 152 is exhibiting a state of charge that is in excess of a selected threshold, then the power management system 124 directs power to the TRU 26. In an embodiment a threshold of 10 percent is employed for the state of charge of the energy storage device 152. In this embodiment, power is provided by the energy storage system 150 and thereby discharging the energy storage device 152. In an embodiment, priority is given to satisfying the power requirements of the TRU 26. Once again, this embodiment may be employed under conditions where the output power of the generator 162 and/or generator power converter 164 is less that that needed to operate the TRU 26. It should be appreciated that while particular threshold of 10% is disclosed and employed for the described embodiments, such values and description are merely illustrative. Other values and applications for the thresholds are possible. For example, in some instances it may be desirable prioritize operation of the TRU 26 such that fully draining the energy storage device 152 is acceptable. Likewise, in other embodiments, it may be desirable to modify the function or curtail the operation of the TRU to avoid excessively discharging the energy storage device 152.

In another embodiment and specialized mode of operation and power flow for the TRU system 26 and the power supply interface 120. In this embodiment, referred to as a fail operational or "limp home" mode, the power supply interface 120 is configured such that, in selected modes of operation power is directed to the TRU 26 from the tractor or vehicle 22. In an embodiment, should the energy storage device 152 exhibit a SOC below a selected threshold e.g., <10% and the generator 162/generator power converter 164 is not operable but the TRU system 26 is operable and requires power, TRU power could be drawn from the power system of the tractor or truck. (i.e. tie into the energy storage device or generator of the tractor/truck). Moreover, it should be appreciated that the described embodiments while generally referring the generator 162 being installed on the trailer portion of the vehicle, 22, such description is merely illustrative. In another embodiment, the generator 162 or another generator could be installed at a hub or axle of the tractor portion of the vehicle 22 without loss of generality and still be fully applicable to the described embodiments. In an embodiment, the tractor/truck power may be routed to the power management system through a grid plug 185. Alternately connectable between the grid power source 182 and the vehicle power. For example, in operation, when vehicle 22 trailer is in operation, for example, on delivery, grid plug 185 would be plugged into the tractor/trailer's electric PTO and act as mobile grid source. The TRU controller 82 would be programmed to determine if the grid plug is active and if so, to pull power (or supplement generator power) only if energy storage device SOC is below threshold as alternative to modify the function or curtail the operation of the TRU system 26.

AC/DC Generator Charging Energy Storage Device

Turning now to FIG. 5, depicted therein are two additional embodiments of the architecture of the power supply interface, in these instances, denoted 220, and the various power sources 122 employed to power the TRU 26. In an embodiment, the power sources 122 may include, but not be limited to an energy storage system 150 operably coupled to the power management system 124 and the grid power source 182. Moreover, as described above, the generator 162, whether directly and/or via a generator power converter 164 is operably connected to the energy storage system 150, and more specifically to the energy storage device 152. In one embodiment, for example, when the generator 162 is an AC generator 162, the generator power converter 164 is an AC/DC converter and configured to receive three phase AC power 163 (e.g., at AC voltage $V_1$, AC current $I_1$ and frequency $f_1$), from the generator 162 and convert it to the third DC power denoted 165b comprising a DC voltage $V_3$, a third DC current $I_3$. Alternatively, in another embodiment, when the generator 162 is a DC generator (denoted in the figures as 162a, the generator power converter, denoted as 164a is a DC/DC converter and configured to receive DC power denoted 163a (e.g., at DC voltage $V_{1a}$, DC current $I_1$a), from the generator 162a and convert it to the third DC power denoted 165b comprising a DC voltage $V_3$, a third DC current $I_3$.

In each embodiment, the third DC power 165b is transmitted from the generator power converter 164 (or 164a) directly to the energy storage system 150. Once again, as described herein, the generator power converter 164, 164a is configured to provide the third DC power 165b based of the requirements of the TRU 26 as described above. In this embodiment, the generator power converter 164, 164a including the voltage control function 166 (see for example, FIG. 3), the current control function 167 (FIG. 3), is configured to facilitate the AC/DC conversion for generator power converter 164, and likewise the DC/DC conversion for generator power converter 164a of an alternative embodiment. In these embodiments, once again the TRU controller 82 provides command signals denoted 169, 169a to the voltage control function 166, and/or current control function 167 respectively, based on the power consumption requirements of the TRU 26 as discussed further herein. As described previously, the voltage control function 166 includes a voltage regulation function and is configured to monitor the output AC or DC voltage from the generator 162 and maintains a constant DC voltage out of the voltage control function 166 for supply to the energy storage system 220 and the energy storage device 152. The current control function 167 monitors and communicates to the TRU 26 the status of current draw from the generator 162, 162a. Once again, the status of the generator 162, 162a is monitored by the TRU controller 82 via line 172, 172a.

Continuing with FIG. 5 and an embodiment of the architecture of the 110 power supply interface 220 and the various power sources 122 employed to power the TRU 26 and the components thereof. As described above, the generator 162, 162a whether directly and/or via a generator power converter 164 is operably connected to the energy storage system 150. In an embodiment, the energy storage device 152, includes electrical switching device 158 controllable by the TRU controller and/or BMS 154 employed as a DC power manager. The electrical switching device 158 is configured to connect power flows of the generator 162/generator power converter 164, 164a, and battery of the energy storage device 152 to feed DC power 155 as needed to the DC/AC converter 156 and to the power management system 124 to satisfy TRU demand Through this circuitry, the TRU demand will be satisfied by either all power from the generator 162/generator converter 164, 164a, all power from the battery or some combination of power from generator 262/generator converter 164, 164a and the battery.

For example, in an embodiment, if the TRU power demand is less than the generator power available, TRU power requirements are met with power from the generator 162/generator converter 164, 164a and any remaining generator power is directed to charge the battery of the energy storage device. Control of the electrical circuitry (through BMS 154) will manage flow into and out of battery and meet TRU demand as needed.

Continuing with the energy storage system, and more specifically to the energy storage device 152, the energy storage system 150 transmits power to and receives power from the power management system 124 via the AC/DC converter 156 operating as a DC/AC converter. Once again, the energy storage system 150 includes, but not be limited to the energy storage device 152, and AC/DC converter 156 and a battery management system 154. In one embodiment, when operating from grid power source 182, the power management system 124 provides three phase AC power to the TRU 26 as described with the power flows above. In addition, as needed, to maintain sufficient charge on the energy storage device 152, the power management system 124 may also direct three phase AC power to the AC/DC converter 156 to formulate a DC voltage and current to charge and store energy on the energy storage device 152. Conversely, in another embodiment, when the grid power source 182 is not available, the energy storage device 152 supplies DC voltage and current to the AC/DC converter 156 operating as a DC/AC converter to supply a three phase AC voltage and current to the power management system 124 for powering the TRU 26. Once again, the TRU 26 may be operated from the energy storage system 150 provided the state of charge of the energy storage device 152 exceeds a selected threshold. In one embodiment, the selected threshold may be 10% state of charge. Once again, as described herein, the battery management system 154 monitors the performance of the energy storage device 152. For example, monitoring the state of charge of the energy storage device 152, a state of health of the energy storage device 152, and a temperature of the energy storage device 152. The battery management system 154 and AC/DC converter 156 are operably connected to and interface with the TRU controller 82. The TRU controller 82 receives information regarding the status of energy storage system 150, including the energy storage device 152 to provide control inputs to the AC/DC converter 156 to monitor the energy storage device, 152, control charge and discharge rates for the energy storage device 152 and the like.

As described with respect to various embodiments herein, examples of the energy storage device 152 may include a battery system (e.g., a battery or bank of batteries), fuel cells, and others devices capable of storing and outputting electric energy that may be direct current (DC). In an embodiment, if the energy storage system 150 includes a battery system for the energy storage device 152, the battery system may have a voltage potential within a range of about two-hundred volts (200V) to about six-hundred volts (600V). In one embodiment, the energy storage device 152 may be contained within the structure of the TRU 26. In an embodiment, the energy storage device 152 is located with the TRU 26, however other configurations are possible. In another embodiment, the energy storage device 152 may be located with the container 24 such as, for example, underneath the cargo compartment 40. Likewise, the AC/DC converter 156 may be located with the container 24 such as, for example, underneath the cargo compartment 40, however, in some embodiments it may be desirable to have the AC/DC converter 156 in close proximity to the power management system 124 and/or the TRU 26 and TRU controller 82. It will be appreciated that in one or more embodiments, while particular locations are described with respect to connection and placement of selected components including the energy storage device 152 and/or AC/DC converter 156, such descriptions are merely illustrative and are not intended to be limiting. Varied location, arrangement and configuration of components is possible and within the scope of the disclosure.

Continuing with FIG. 5, as described earlier, the power supply interface 220 may include, interfaces to various power sources 122 managed and monitored by power management system 124. The power management system 124 manages and determines electrical power flows in the power supply interface 220 based upon the operational needs of the TRU 26 and the capabilities of the components in the power supply interface 220, (e.g., generator 162, 162a, generator power converter 164, 164a, energy storage device 152, grid power source 182, and the like. The power management system 124 is configured to determine a status of various power sources 122, control their operation, and direct the power to and/or from the various power sources 122 and the like, based on various operational requirements of the TRU 26. In an embodiment, the TRU controller 82 receives various signals indicative of the operational state of the TRU 26 and determines the power requirements for the TRU system 26 accordingly and directs the power supply interface 220 and specifically the power management system 124 to direct power accordingly to address the requirements of the TRU 26. In one embodiment, the TRU controller 82 monitors the RAT and optionally the SAT as measured by the temperature sensors 142 and 146 respectively. The TRU controller 82 estimates the power requirements for the TRU 26 based on the RAT (among others) and provides commands accordingly to the various components of the power supply interface 220 and specifically the power management system 124, energy storage system 150, and generator power converter 164 to manage the generation, conversion, and routing of power in the power supply interface 220 and TRU system 26.

Power Management System with AC/DC Converter

Figure 6:
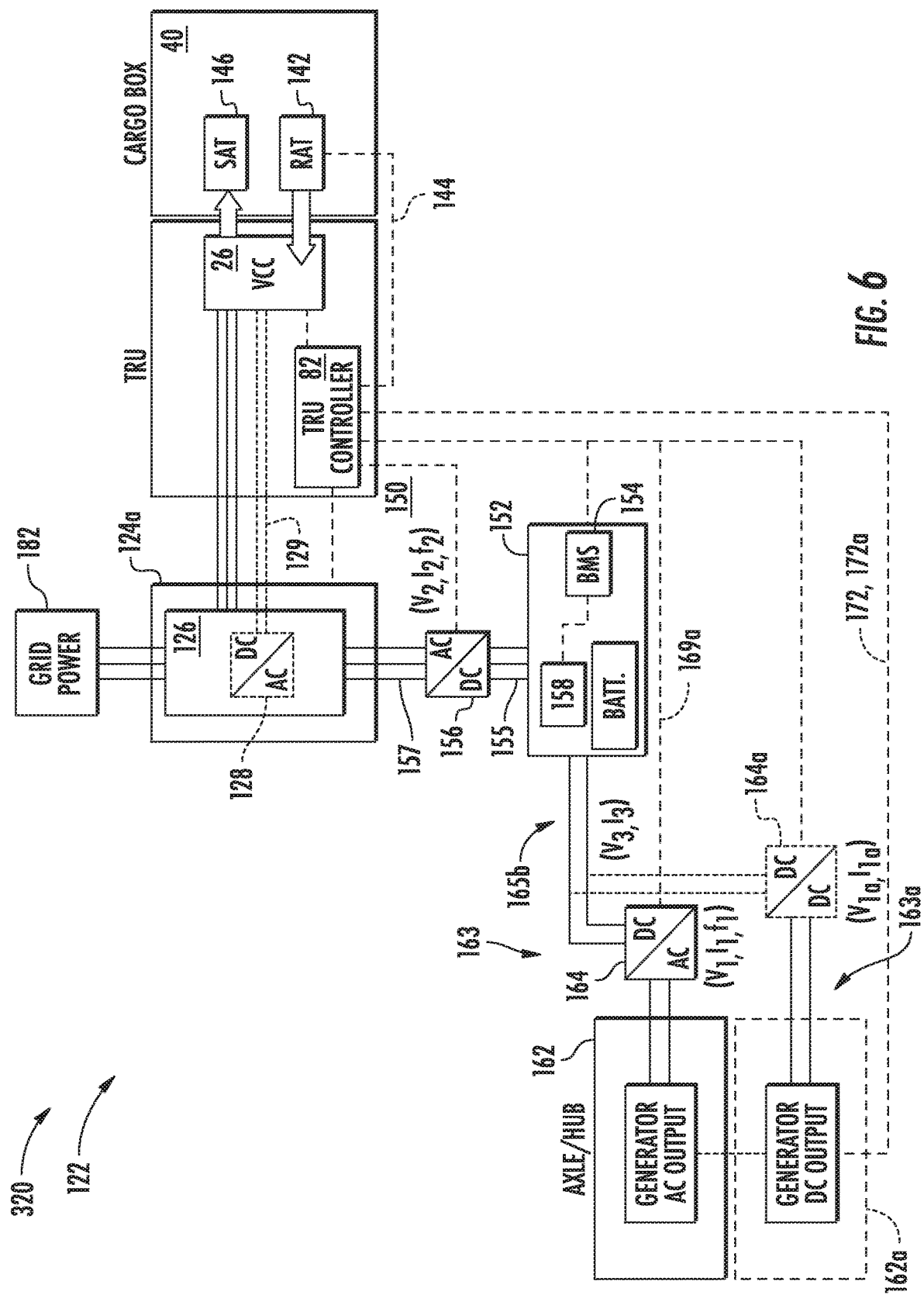
FIG. 6 is a block diagram of a transportation refrigeration unit and power system, according to an embodiment of the present disclosure.

Turning now to FIG. 6, depicted therein are two additional embodiments of the architecture of the power supply interface, in these instances, denoted 320, and the various power sources 122 employed to power the TRU 26. In an embodiment, the power sources 122 may include, but not be limited to an energy storage system 150 operably coupled to the power management system 124a, which is similar to the power management system 124 of the earlier embodiments, but including additional functions and features, and the grid power source 182. Moreover, as described above, the generator 162, whether directly and/or via a generator power converter 164 is operably connected to the energy storage system 150, and more specifically to the energy storage device 152. In one embodiment, for example, when the generator 162 is an AC generator 162, the generator power converter 164 is an AC/DC converter and configured to receive three phase AC power 163 (e.g., at AC voltage $V_1$, AC current $I_1$ and frequency $f_1$), from the generator 162 and convert it to the third DC power denoted 165b comprising a DC voltage $V_3$, a third DC current $I_3$. Alternatively, in another embodiment, when the generator 162 is a DC generator (denoted in the figures as 162a, the generator power converter, denoted as 164a is a DC/DC converter and configured to receive DC power denoted 163a (e.g., at DC voltage $V_{1a}$, DC current $I_{1a}$), from the generator 162a and convert it to the third DC power denoted 165b comprising a DC voltage $V_3$, a third DC current $I_3$.

In each embodiment, the third DC power 165b is transmitted from the generator power converter 164 (or 164a) directly to the energy storage system 150. Once again, as described herein, the generator power converter 164, 164a is configured to provide the third DC power 165b based of the requirements of the TRU 26 as described above. In this embodiment, the generator power converter 164, 164a including the voltage control function 166 (see for example, FIG. 3), the current control function 167 (FIG. 3), is configured to facilitate the AC/DC conversion for generator power converter 164, and likewise the DC/DC conversion for generator power converter 164a of an alternative embodiment. In these embodiments, once again the TRU controller 82 provides command signals denoted 169, 169a to the voltage control function 166, and/or current control function 167 respectively, based on the power consumption requirements of the TRU 26 as discussed further herein. As described previously, the voltage control function 166 includes a voltage regulation function and is configured to monitor the output AC or DC voltage from the generator 162 and maintains a constant DC voltage out of the voltage control function 166 for supply to the energy storage system 320 and the energy storage device 152. The current control function 167 monitors and communicates to the TRU 26 the status of current draw from the generator 162, 162a. Once again, the status of the generator 162, 162a is monitored by the TRU controller 82 via line 172, 172a.

Continuing with FIG. 6 and an embodiment of the architecture of the 110 power supply interface 320 and the various power sources 122 employed to power the TRU 26 and the components thereof. As described above, the generator 162, 162a whether directly and/or via a generator power converter 164 is operably connected to the energy storage system 150. In an embodiment, the energy storage device 152, includes electrical switching device 158 controllable by the TRU controller and/or BMS 154 employed as a DC power manager. The electrical switching device 158 is configured to connect power flows of the generator 162/generator power converter 164, 164a, and battery of the energy storage device 152 to feed DC power 155 as needed to the DC/AC converter 156 and to the power management system 124 to satisfy TRU demand Through this circuitry, the TRU demand will be satisfied by either all power from the generator 162/generator converter 164, 164a, all power from the battery or some combination of power from generator 262/generator converter 164,164a and the battery. For example, in an embodiment, if the TRU power demand is less than the generator power available, TRU power requirements are met with power from the generator 162/generator converter 164,164a and any remaining generator power is directed to charge the battery of the energy storage device. Control of the electrical circuitry (through BMS 154) will manage flow into and out of battery and meet TRU demand as needed.

Continuing with FIG. 6 and an embodiment of the architecture of the power supply interface 320 and the various power sources 122 employed to power the TRU 26 and the components thereof. As described above, the generator 162, 162a whether directly and/or via a generator power converter 164 is operably connected to the energy storage system 150, and more specifically to the energy storage device 152. The energy storage system 150 transmits power to and receives power from the power management system 124a. Once again, the energy storage system 150 includes, but not be limited to the energy storage device 152, and AC/DC converter 156 and a battery management system 154. In one embodiment, when operating from grid power source 182, the power management system 124*a* provides three phase AC power to the TRU 26 as described with the power flows above. In addition, as needed, to maintain sufficient charge on the energy storage device 152, the power management system 124*a* may also direct three phase AC power to the AC/DC converter 156 to formulate a DC voltage and current to charge and store energy on the energy storage device 152. Conversely, in another embodiment, when the grid power source 182 is not available, the energy storage device 152 supplies DC voltage and current to the AC/DC converter 156 operating as a DC/AC converter to supply a three phase AC voltage and current to the power management system 124 for powering the TRU 26. Once again, the TRU 26 may be operated from the energy storage system 150 provided the state of charge of the energy storage device 152 exceeds a selected threshold. In one embodiment, the selected threshold may be 10% state of charge. Once again, as described herein, the battery management system 154 monitors the performance of the energy storage device 152. For example, monitoring the state of charge of the energy storage device 152, a state of health of the energy storage device 152, and a temperature of the energy storage device 152. The battery management system 154 and AC/DC converter 156 are operably connected to and interface with the TRU controller 82. The TRU controller 82 receives information regarding the status of energy storage system 150, including the energy storage device 152 to provide control inputs to the AC/DC converter 156 to monitor the energy storage device, 152, control charge and discharge rates for the energy storage device 152 and the like.

As described previously with respect to the various embodiments herein, examples of the energy storage device 152 may include a battery system (e.g., a battery or bank of batteries), fuel cells, and others devices capable of storing and outputting electric energy that may be direct current (DC) as discussed herein.

Continuing with FIG. 6, as described earlier, the power supply interface 320 may include, interfaces to various power sources 122 managed and monitored by power management system 124*a*. The power management system 124 manages and determines electrical power flows in the power supply interface 320 based upon the operational needs of the TRU 26 and the capabilities of the components in the power supply interface 320, (e.g., generator 162, 162*a*, generator power converter 164, 164*a*, energy storage device 152, grid power source 182, and the like. The power management system 124*a* is configured to determine a status of various power sources 122, control their operation, and direct the power to and/or from the various power sources 122 and the like, based on various operational requirements of the TRU 26. Moreover, in yet another embodiment, the power management system 124*a* may also include an AC/DC converter 128 configured to receive the incoming three phase AC voltage 157 and convert a portion thereof to a DC voltage 129 to facilitate maintenance, configuration and operation of the TRU 26. In this embodiment, the addition of AC/DC converter 128 eliminates the need for a separate TRU battery to maintain operation of the TRU controller 82. Moreover, in one embodiment, the DC voltage generated by the AC/DC converter 129 is also employed to power selected sensors and components of the TRU system 26. Advantageously, generating the needed low voltage DC power in the power management systems simplifies the wiring and routing of the TRU system 26 and power supply interface 320 by eliminating an additional set of DC cabling from the energy storage device 152 beyond the cabling going to the AC/DC converter 156. Otherwise, the power management system 124*a*, would require two sets of DC cabling (a high voltage set directed to the AC/DC converter 156, and a low voltage set optionally directed to the TRU directly) out of energy storage device vs. only the single DC cabling in the described embodiments.

In an embodiment, the TRU controller 82 receives various signals indicative of the operational state of the TRU 26 and determines the power requirements for the TRU system 26 accordingly and directs the power supply interface 320 and specifically the power management system 124*a* to direct power accordingly to address the requirements of the TRU 26. In one embodiment, the TRU controller 82 monitors the RAT and optionally the SAT as measured by the temperature sensors 142 and 146 respectively. The TRU controller 82 estimates the power requirements for the TRU 26 based on the RAT (among others) and provides commands accordingly to the various components of the power supply interface 320 and specifically the power management system 124, energy storage system 150, and generator power converter 164 to manage the generation, conversion, and routing of power in the power supply interface 320 and TRU system 26.

The TRU 26 may further include a renewable power source 110 (FIG. 1) configured to recharge the batteries of the energy storage device 152. One embodiment of a renewable power source 110 may be solar panels mounted, for example, to the outside of the top wall 30 of the container 24 (also see FIG. 1). For example the renewable power source 110 could generate all or a portion of the needed low voltage DC power for the TRU controller 82. Once again, such a configuration simplifies the wiring and routing of the system design by eliminating an additional set of DC cabling from the energy storage device 152 beyond the HV cabling going toe the AC/DC converter 156.

Benefits of the present disclosure when compared to more traditional systems include no fuel carriage, fuel system and fuel consumption, and a refrigeration unit that emits less noise and no combustion byproducts. Yet further, the present disclosure includes an energy storage device that is conveniently and efficiently recharged to meet the power demands of the refrigeration unit.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transportation refrigeration unit (TRU) and power system comprising:
    a compressor configured to compress a refrigerant, the compressor having compressor motor configured to drive the compressor;
    an evaporator heat exchanger operatively coupled to the compressor;
    an evaporator fan configured to provide return airflow from a return air intake and flow the return airflow over the evaporator heat exchanger;
    a return air temperature (RAT) sensor disposed in the return airflow and configured measure the temperature of the return airflow;
    a TRU controller operably connected to the RAT sensor and configured to execute a process to determine an AC power requirement for the TRU based on at least the RAT;
    a generator power converter, the generator power converter configured to receive a first DC power provided by a DC generator and transmit a second DC power;
    an energy storage system configured to receive the second DC power and also provide a first a three phase AC power and receive a second three phase AC power; and
    a power management system configured to receive the first three phase AC power and direct at least a portion of the first three phase AC power to the TRU based at least in part on the AC power requirement.

2. The TRU and power system of claim 1, further including a grid power source configured to provide a grid three phase AC power to the power management system.

3. The TRU and power system of claim 1, wherein the generator power converter includes an DC/DC converter and the first DC power exhibits a first DC voltage and a first DC current, and the second DC power exhibits a second DC voltage and a second DC current.

4. The TRU and power system of claim 1, wherein the generator power converter is operably connected to the TRU controller, the generator power converter including a voltage control function, a current control function, wherein at least the voltage control function is responsive at least in part to AC power requirement.

5. The TRU and power system of claim 1, wherein the energy storage system comprises:
    an energy storage device;
    a switching device; and
    at least one of an DC/AC converter configured to provide the first three phase AC power to the power management system based at least in part on the AC power requirement and an AC/DC converter configured to receive at least a portion of the second three phase AC power to supply the energy storage device.

6. The TRU and power system of claim 5, wherein the switching device is configured to direct DC power flows in the energy storage system based at least in part on the AC power requirement, the directing including:
    directing the second DC voltage to at least one of the energy storage device and the DC/AC converter;
    directing DC power from the energy storage device to the DC/AC converter; and
    receiving DC power from the AC/DC converter and providing it to the energy storage device.

7. The TRU and power system of claim 5, wherein the energy storage device comprises at least one of a battery, fuel cell, and flow battery.

8. The TRU and power system of claim 5, further including a battery management system operably connected to the TRU controller and configured to monitor at least a state of charge of the energy storage device.

9. The TRU and power system of claim 8, wherein the DC/AC converter and AC/DC converter are integrated and wherein the DC/AC converter or AC/DC converter is operably connected to the TRU controller, and the TRU controller is configured to direct power flows to the power management system and from the power management system based at least in part on at least one of the AC power requirement and the state of charge of the energy storage device.

10. The TRU and power system of claim 9, wherein the power management system is configured to: receive the first three phase AC power from the energy storage system and a grid three phase AC power from a grid power connection; and provide at least one of a selected three phase AC power to of the TRU and the second three phase AC power to the energy storage system.

11. The TRU and power system of claim 9, further including the power management system comprises a power control switching device, the power control switching device responsive to the TRU controller and configured to direct a plurality of power flows in the TRU and power system, the plurality of power flows based at least in part on at least the AC power requirement, a state of charge of an energy storage device of the energy storage system.

12. The TRU and power system of claim 11, wherein a first portion of power flows of the plurality of power flows comprises:
    receiving a grid three phase AC power from the grid if the grid power source is operative; and
    directing at least a portion of the grid three phase AC power to the TRU and energy storage system if the TRU is operative and an energy storage device of the energy storage system exhibits a state of charge less than a selected threshold; or directing at least a portion of the grid three phase AC power to the TRU, if the TRU is operative and an energy storage device of the energy storage system exhibits a state of charge greater than or equal to about the selected threshold; or directing at least a portion of the grid three phase AC power to the energy storage system if the TRU is not operative and an energy storage device of the energy storage system exhibits a state of charge less than a second selected threshold.

13. The TRU and power system of claim 11, wherein a second portion of power flows of the plurality of power flows comprises:

receiving the first three phase AC power from the energy storage systems;

receiving a grid three phase AC power from the grid power source if the grid AC power source is operative; and synchronizing and combining the first three phase AC power from the energy storage system and the grid three phase AC power and directing the combined three phase AC power to the TRU if the TRU is operative and an energy storage device of the energy storage system exhibits a state of charge greater than or equal to about another selected threshold.

14. A method of generating and directing power to a transportation refrigeration unit (TRU) system having a compressor configured to compress a refrigerant, an evaporator heat exchanger operatively coupled to the compressor; an evaporator fan configured to provide return airflow from a return air intake and flow the return airflow over the evaporator heat exchanger; a return air temperature (RAT) sensor disposed in the return airflow and configured measure the temperature of the return airflow; and a TRU controller, the method comprising:

determining an AC power requirement for the TRU based on at least the RAT;

a operably connecting a generator power converter to a DC generator, the generator power converter configured to receive a first DC power provided by the DC generator and transmit a second DC power;

operably connecting an energy storage system, the energy storage system operable to at least one of receive the second DC power, provide first three phase AC power, and receive a second three phase AC power; and operably connecting a power management system to the energy storage system and the TRU, the power management system configured receive the second three phase AC power to direct power the TRU based at least in part on the AC power requirement.

15. The method of claim 14, further including receiving by the power management system, a grid three phase AC power from a grid power source.

16. The method of claim 14, further including converting, by the generator power converter, the first DC power with a first DC voltage and a first DC current, to the second DC power with a second DC voltage and a second DC current.

17. The method of claim 14, further including: at least one of:

providing the first three phase AC power to the power management system based at least in part on the AC power requirement; and receiving the second three phase AC power from the power management system and converting the second three phase AC power to a DC power for charging the energy storage system;

wherein the energy storage system comprises an energy storage device, a switching device, and at least one of an AC/DC converter and a DC/AC converter.

18. The method of claim 17, further including configuring the switching device to direct DC power flows in the energy storage system based at least in part on the AC power requirement, the directing including:

applying the second DC voltage to at least one of the energy storage device and the DC/AC converter;

applying DC power from the energy storage device to the DC/AC converter; and receiving DC power from the AC/DC converter and providing it to the energy storage device.

19. The method of claim 17, further including directing a plurality of power flows to the TRU system with a power control switching device of the power management system, the power control switching device responsive to the TRU controller, the plurality of power flows based at least in part on at least the AC power requirement, a state of charge of an energy storage device of the energy storage system.

20. The method of claim 19, wherein a first portion of power flows of the plurality of power flows comprises:

receiving a grid three phase AC power from the grid if the grid power source is operative; and directing at least a portion of the grid three phase AC power to the TRU and energy storage system if the TRU is operative and an energy storage device of the energy storage system exhibits a state of charge less than a selected threshold; or directing at least a portion of the grid three phase AC power to the TRU, if the TRU is operative and an energy storage device of the energy storage system exhibits a state of charge greater than or equal to about the selected threshold; or directing at least a portion of the grid three phase AC power to the energy storage system if the TRU is not operative and an energy storage device of the energy storage system exhibits a state of charge less than a second selected threshold.

* * * * *